United States Patent [19]

van de Plassche

[11] 3,914,683

[45] Oct. 21, 1975

[54] CURRENT STABILIZING ARRANGEMENT WITH RESISTIVE-TYPE CURRENT AMPLIFIER AND A DIFFERENTIAL AMPLIFIER

[75] Inventor: Rudy Johan van de Plassche, Eindhoven, Netherlands

[73] Assignee: U.S. Philips Corporation, New York, N.Y.

[22] Filed: Mar. 18, 1974

[21] Appl. No.: 451,783

[30] Foreign Application Priority Data

Mar. 20, 1973 Netherlands ....................... 7303851

[52] U.S. Cl. ............................ 323/1; 323/4; 323/9; 323/22 T; 330/30 D

[51] Int. Cl.² ............................................ G05F 1/60

[58] Field of Search ...................... 323/1, 4, 9, 22 T; 330/30 D, 19, 20, 69

[56] References Cited

OTHER PUBLICATIONS

Callahan, "Charts Speed the Designing of Constant Current Sources", *Electronics*, Aug. 17, 1970, pp. 92–95.

Van Kessel et al., "Integrated Linear Basic CK7S," *Phillips Tech. Rev.*, 1971, Vol. 32, No. 1, pp. 1–12.

Jaeger, "Active Load for Diff. Amp.," *IBM Tech. Disc. Bull.*, Vol. 10, No. 10, Mar. 1974, pp. 3140, 3141.

*Primary Examiner*—Gerald Goldberg
*Attorney, Agent, or Firm*—Frank R. Trifari; Bernard Franzblau

[57] ABSTRACT

The invention relates to a current stabilising arrangement which comprises a first and a second parallel circuit connected between a first and a second common terminal, in which circuits two currents whose magnitudes have a mutually fixed ratio are sustained. The first circuit includes the main current path of a first transistor of a first conductivity type and the second circuit including the main current path of a second transistor of said first conductivity type and a first impedance. One end of the first impedance is connected to said second transistor and the other end is connected to the second common terminal. The control electrodes of the first and the second transistor are interconnected.

18 Claims, 6 Drawing Figures

CURRENT STABILIZING ARRANGEMENT WITH RESISTIVE-TYPE CURRENT AMPLIFIER AND A DIFFERENTIAL AMPLIFIER

Such a current stabilising arrangement is, for example, known from Canadian Pat. No. 960,304. In this current stabilizing arrangement mutually constant currents are maintained in the two parallel circuits with the aid of a current amplifier, also called a current mirror, which by means of parallel-connected semiconductor junctions having equal areas maintains said current ratio. Furthermore, the second transistor in said known current stabilising arrangement has a larger emitter area than the first transistor. However, by means of the current amplifier it is also possible to define a current ratio unequal to unity in the two parallel circuits and select equal emitter areas for the first and the second transistor.

The operation of such current stabilizing arrangements is based on the fact that owing to the fixed ratio between the currents in the two parallel circuits, a stable condition can be obtained only for one specific value (unequal to zero) of these currents, so that the magnitude of the currents appearing at the two common terminals is fully determined.

Criteria to be met by said current stabilizing arrangement are, inter alia, high stability unambiguous relationship between the magnitude of the current produced and the magnitude of the first impedance and a satisfactory supply voltage variation rejection. The extent in which said criteria are complied with depends on several factors, such as the accuracy upon which the transistors, in particular the dimensions of the emitter area, can be manufactured and the extent to which the desired current ratio between the currents in the two circuits is to be maintained under all conditions.

It is an object of the invention to provide a current stabilizing arrangement of the type mentioned in the preamble which to a very high degree conforms to said criteria.

The invention is characterized in that the first and the second circuit additionally include a second and a third impedance respectively, via which impedances the first and the second transistors, respectively are connected to the first common terminal and furthermore in that a differential amplifier is provided having a first and a second input, of which the first input is connected to the end of the second impedance which is remote from the first common terminal and the second input to the end of the third impedance which is remote from the first common terminal, and in that the control electrodes of the first and the second transistor whether or not via a level shifting circuit receive a control signal which is determined by the output signal of the differential amplifier.

The step according to the invention first of all ensures that the supply voltage deviations rejection is appreciably better than with the known arrangement, which is mainly caused by the fact that the differential amplifier assures that in the event of a supply voltage variation the base-collector voltages of the first and second transistors vary to the same extent so that the symmetry of the circuit arrangement is not disturbed by the effect of the collector voltage on the base-emitter voltage of the transistors.

The second and the third impedance may be constituted in known manner by the branches of a current amplifier which extends between a first and a second terminal respectively and a sum terminal, the sum terminal being connected to the first common terminal thereby maintaining currents of a mutually fixed ratio in the two branches.

The step according to the invention furthermore yields the additional advantage that instead of the current amplifier the second and the third impedance may alternatively be formed by resistances. In particular if the current amplifier employs integrated transistors of the lateral pnp-type, which is usually necessary for reasons of integration technology, the accuracy of such a current amplifier appears to be liable to improvement. However, resistances can be made in integrated form with mutually very accurate ratios, thus enabling the ratios of the currents in the two circuits to be defined very accurately.

The output of the differential amplifier may be connected directly to the control electrodes of the first and the second transistor so that the output signal of the said differential amplifier directly acts as a control signal for these transistors. Naturally, the output signal may also be applied to these control electrodes via a follower circuit, for example, an emitter follower or any other arbitrary network. If a further impedance, for example a diode, is included between the control electrodes of the first and the second transistor and the second common terminal, the collector current of such an emitter follower may serve as the output current of the current stabilizing arrangement. The magnitude of said output current is then, inter alia, determined by the ratio of the areas of said diode and the transistors.

According to a further preferred embodiment of the current stabilizing arrangement according to the invention, the output signal of the differential amplifier is applied to the first common terminal, and the control electrodes of the first and the second transistor are connected to a point of the differential amplifiers that has a voltage which is related to the common mode signal at the two inputs of the differential amplifier. Such a point is, for example, the common emitter of two transistors connected as a differential pair or any other point in the common emitter circuit (tail) of such a difference pair. Apart from assuring that the base-collector voltages of the first and the second transistor always mutually vary to the same extent, said preferred embodiment has the advantage that these voltages remain constant in spite of possible supply voltage variations. The output signal of the differential amplifier may suitably be applied to the first common terminal via a third transistor of the first conductivity type connected as an emitter follower. The collector of said third transistor may then function as output current terminal in this embodiment of the current stabilizing arrangement according to the invention.

The output current of a current stabilizing arrangement according to the invention has an accurately defined temperature coefficient and may therefore be employed with advantage for realizing a temperature-independent current and/or voltage, as is to be explained in more detail in the description with reference to the Figures.

By a proper selection of the magnitude of the first impedance and the resistance constituting the second and third impedance a temperature independent voltage can also be made available at the first common terminal, in which case the circuit arrangement may also serve as a voltage source.

By the inclusion of two additional compensation resistances the temperature coefficient of the output current may be given substantially any arbitrary value. Of these two compensation resistances a first resistance is included in the first circuit between the first transistor and the second common terminal and the second compensation resistance is incorporated between the control electrode of the first transistor and the connection point between said first transistor and the first compensation resistance. It has been found that the temperature coefficient of the output current depends on the resistance ratio of these two compensation resistances.

The invention will now be described in more detail, by way of example, with reference to the accompanying drawing, in which.

Figures 1, 2:
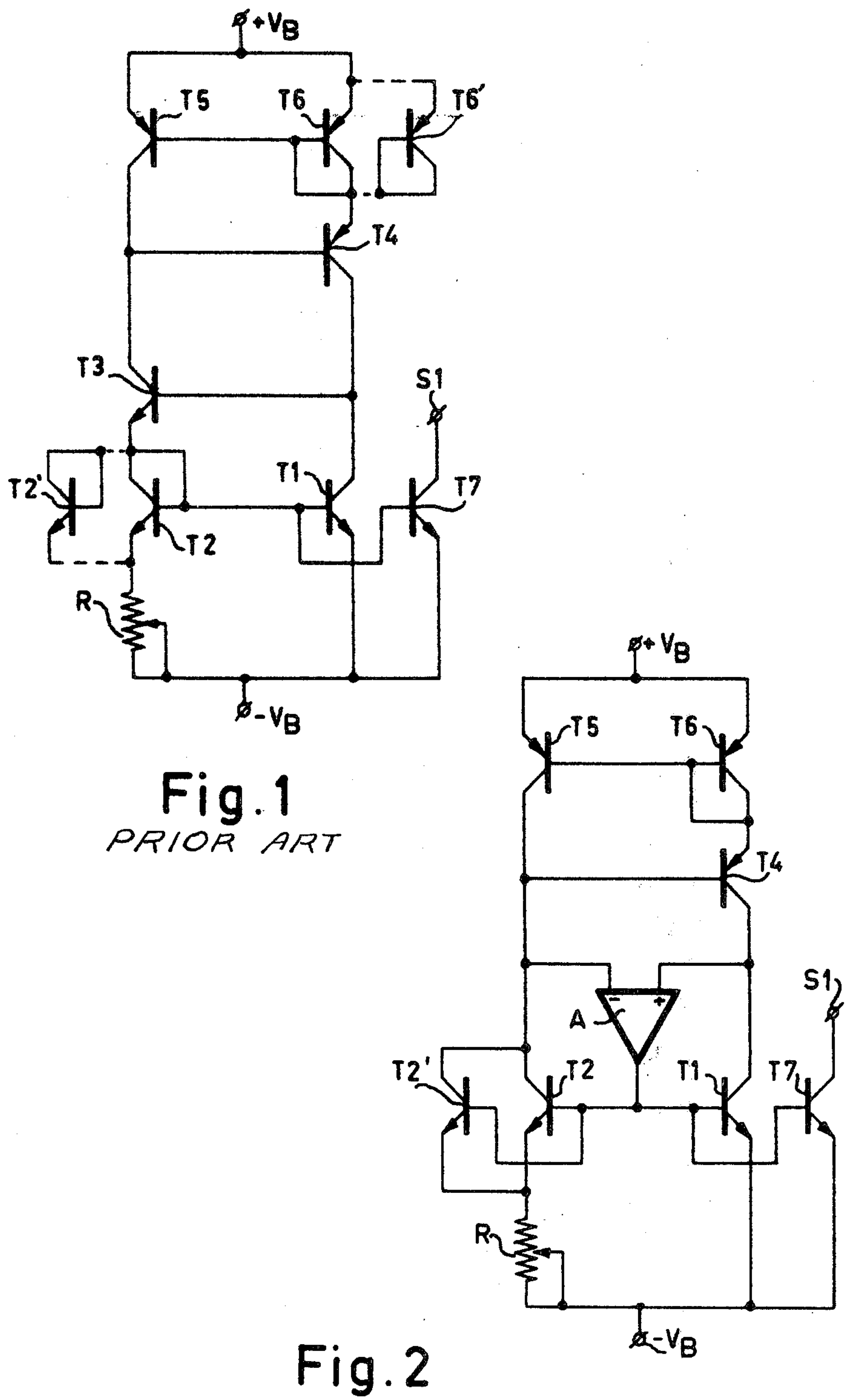
Fig. 1 PRIOR ART, Fig. 2
FIG. 1 shows the known current stabilizing arrangement.
FIGS. 2, 3, 4 and 5 show four embodiments of the current stabilizing arrangement according to the invention.

The known current stabilizing arrangement of FIG. 1 comprises a first current amplifier with pnp-transistors $T_4$, $T_5$ and $T_6$. Of these transistors $T_5$ and $T_6$ are connected in parallel with their base-emitter paths and transistor $T_4$ is connected in series with the transistor $T_6$ which is connected as a diode, the base of $T_4$ being connected to the collector of transistor $T_5$. If transistors $T_5$ and $T_6$ are identical, this first current amplifier ensures that identical currents are sustained in both circuits of the current stabilizing arrangement, i.e. the circuit including the emitter-collector path of transistor $T_5$ and the circuit including the emitter-collector paths of transistors $T_6$ and $T_4$.

The current stabilizing arrangement furthermore includes an npn transistor $T_1$ whose base-emitter path shunts the series connection of npn transistor $T_2$, which is connected as a diode, and a resistance R. The collector of transistor $T_1$ is connected to the collector of transistor $T_4$ and to the base of a further npn transistor $T_3$. The emitter-collector path of transistor $T_3$ connects the transistors $T_2$ and $T_5$.

If in both circuits of the current stabilizing arrangement a mutually equal current is sustained by means of the first current amplifier, the area of the transistor $T_2$ should be greater than that of transistor $T_1$ so as to allow a stable condition with a current unequal to zero, which is schematically represented in the Figure by the transistor $T_2'$, which is connected as a diode in parallel with transistor $T_2$. The absolute magnitude of the currents in the two circuits is now uniquely determined by the value of the resistance R and the ratio between the total emitter area of $T_2$, $T_2'$ and the emitter area of $T_1$. Assuming that the currents in the two circuits equal I, the following requirement is to be met $$IR + \frac{KT}{q} \ln \frac{I}{nI_{s2}} = \frac{KT}{q} \ln \frac{I}{I_{s1}} \qquad (1)$$

where $k$ is the Boltzmann constant, $T$ the absolute temperature, $q$ the elementary charge, $I_{s1}$ and $I_{s2}$ the saturation currents of transistors $T_1$ and $T_2$ respectively, and $n$ the ratio of the emitter areas of $T_2$, $T_2'$ and $T_1$. Assuming that $I_{s1} = I_{s2}$, it follows from (1) that $$I = \frac{KT}{qR} \ln n \qquad (2)$$

from which it is evident that the magnitude of the current $I$ is uniquely defined by $R$ and $n$.

Instead of identical currents it is alternatively possible to impress currents with a mutually fixed ratio on the two circuits of the current stabilizing arrangement by selecting unequal emitter areas for the transistors $T_6$ and $T_5$, which is schematically represented in the Figure by the transistor $T_6'$, which is connected as a diode in parallel with $T_6$. In that instance the transistors $T_1$ and $T_2$ may have equal emitter areas. This does not affect the basic operation of the circuit arrangement.

An output current may, for example, be taken from the collector (terminal $S_1$) of an additional transistor $T_7$, whose base-emitter path is connected in parallel with the base-emitter path of transistor $T_1$.

It appears that there are two major causes for the unsatisfactory operation of said known arrangements in accurate applications. In the first place it appears that the supply voltage variations rejection is still inadequate, so that supply voltage variations have too great an influence on the magnitude of the supplied output current. Secondly, it was found to be very difficult to define the ratio between the currents in the two circuits with great accuracy. On the one hand this is caused by the fact that the accuracy with which emitter areas can be realized is limited. On the other hand, especially if the first current amplifier employs integrated lateral pnp transistors $T_4$ through $T_6$, which generally have a small current amplification factor, the desired current ratio is disturbed by the base currents of the transistors $T_4$ through $T_6$. This imposes limits on the unique relationship between the magnitude of the resistance R and the magnitude of the supplied current.

The current stabilizing arrangement according to the invention provides an improvement on this. FIG. 2 shows a first embodiment. Identical elements in this Figure and subsequent Figures have the same reference numerals. The embodiment of FIG. 2, in a similar way to the circuit arrangement of FIG. 1, includes a current amplifier consisting of the pnp transistors $T_4$, $T_5$ and $T_6$, which ensures that equal currents are sustained in both circuits of the current stabilizing arrangement. Furthermore, the arrangement also includes an npn transistor $T_1$ whose base-emitter path by-passes the series connection of npn transistor $T_2$ and resistance R. Since the currents in the two circuits are assumed to be equal, the emitter area of transistor $T_2$ must again be greater than that of transistor $T_1$, which is denoted by the transistor $T_2'$ in parallel with the transistor $T_2$.

In contradistinction to the circuit arrangement of FIG. 1, transistor $T_2$ is not connected as a diode by short-circuiting its collector-base path, but the required base current for transistors $T_1$ and $T_2$ is supplied by a schematically represented differential amplifier A of which one input (+) is connected to the collector of transistor $T_1$ and the other input (−) to the collector of the transistor $T_2$.

It appears that this step yields an appreciable improvement as regards supply voltage rejection. This has two different causes. On the one hand, the differential amplifier A ensures that the collector-base voltages of transistors $T_1$ and $T_2$ are always equal, for the voltages at the two inputs are always equal at sufficient gain. Indeed, in the event of a supply voltage variation ($\pm V_B$) the collector-base voltages of transistors $T_1$ and $T_2$ will vary, but because this happens in an identical manner in both circuits of the current stabilizing arrangement the symmetry of the arrangement is not affected and the influence thereof is much smaller than with the known arrangement in which the said symmetry is lost. A second cause is the fact that owing to the differential amplifier A the collector-base voltage of transistor $T_4$ always remains constant, irrespective of supply voltage variations, so that no effect at all on the base-emitter voltage of this transistor occurs as a consequence of collector voltage variation.

Obviously, the arrangement may also be designed so that the current amplifier $T_4$, $T_5$, $T_6$ causes unequal currents in the two circuits. An output current can be taken from terminal $S_1$, which carries the collector current of a transistor $T_7$, in a similar way as in FIG. 1.

Figure 3:
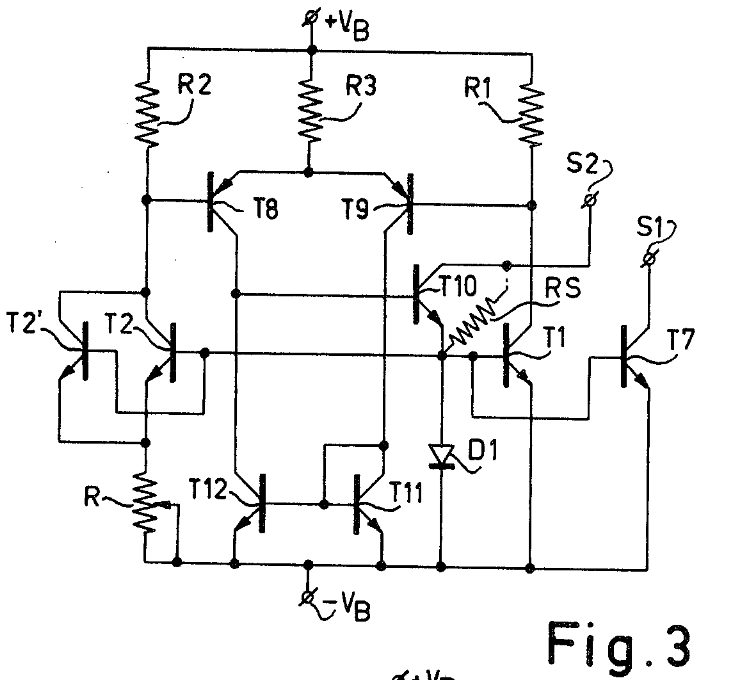

FIG. 3 shows a second embodiment of the current stabilizing arrangement according to the invention. The essential difference with the embodiment of FIG. 2 is that the first current amplifier $T_4$, $T_5$, $T_6$ in this embodiment is replaced by two resistances $R_1$ and $R_2$, each of which is included in a respective circuit of the current stabilizing arrangement. The differential amplifier has been further elaborated and, for example, includes a pnp transistor pair $T_8$, $T_9$ with a common emitter resistance $R_3$ and an active collector load consisting of the current mirror $T_{11}$, $T_{12}$. The output signal of this differential amplifier may be fed directly to the base electrodes of the transistors $T_1$ and $T_2$, but in the present embodiment this is effected by transistor $T_{10}$, which is connected as an emitter follower. This yields the advantage that the collector of the transistor $T_{10}$ can be used as an additional current output $S_2$. An impedance, for example a diode $D_1$, is preferably included in series with said transistor $T_{10}$ and in parallel with the base-emitter path of transistor $T_1$.

The possibility of using resistances $R_1$ and $R_2$ instead of the current amplifier of FIG. 2 directly results from the use of the differential amplifier. Each of the two inputs of said amplifier is connected to one end of one of the resistances so that the voltages across the two resistances are equal and, if the resistances $R_1$ and $R_2$ are equal, equal currents will flow in both circuits of the current stabilizing arrangement. The use of resistances has the advantage that the current ratio can be defined more accurately because integration permits a more accurate realisation of resistance ratios than ratios between the emitter areas of transistors. Instead of equal resistances $R_1$ and $R_2$ it is, of course, alternatively possible to use unequal resistances so as to realize a current ratio unequal to unity in the two circuits of the current stabilizing arrangement.

Figure 4:
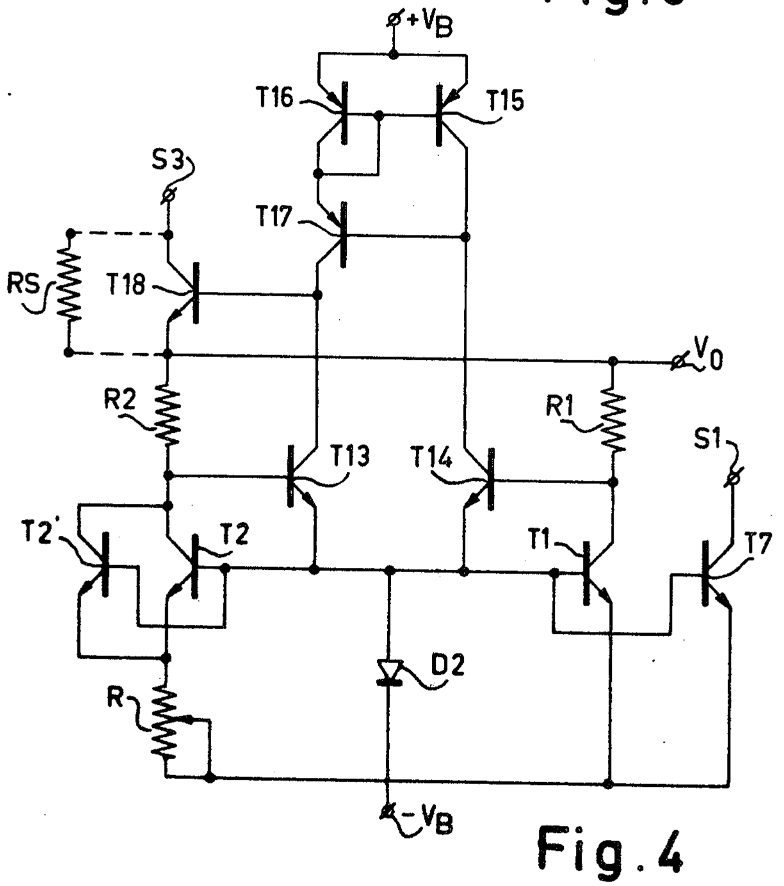

The third embodiment of the current stabilizing arrangement according to the invention, shown in FIG. 4, is identical to that of FIG. 3 as regards the arrangement of the two parallel circuits. The differential amplifier, however, now includes the npn transistors $T_{13}$, $T_{14}$, which are connected as a differential pair. The emitter of $T_{13}$ and $T_{14}$ are connected via a common emitter impedance, which in the present invention is a diode $D_2$, to the negative terminal $-V_B$ of the supply source. The collectors of these transistors are loaded by a triple current mirror $T_{15}$, $T_{16}$, $T_{17}$. The output signal of this differential amplifier is taken from the collector of the transistor $T_{17}$ and fed to the base of a transistor $T_{18}$, connected in emitter-follower arrangement, whose emitter is connected to the junction of the resistances $R_1$ and $R_2$ and whose collector may constitute a current output $S_3$ of the current stabilizing arrangement. The base electrodes of transistors $T_1$ and $T_2$ are connected to the emitters of the two transistors $T_{13}$, $T_{14}$ of the differential amplifier.

However, there is no objection against including an arbitrary network between the base electrodes of transistors $T_1$ and $T_2$ and the emitters of transistors $T_{13}$ and $T_{14}$.

The design of the current stabilizing arrangement with the differential amplifier as shown in FIG. 4 first of all ensures that the ratio of the currents in the two parallel circuits can be defined by the resistances $R_1$ and $R_2$. Compared with the embodiments of FIGS. 2 and 3, however, an additional advantage is obtained. This additional advantage is that the collector-base voltages of the transistors $T_1$ and $T_2$ are not only equal to each other, but even remain highly constant, irrespective of supply voltage variations. This is because the base electrodes of the transistors $T_1$ and $T_2$ are connected to the emitters of the transistor $T_{13}$ and $T_{14}$ which is a common-mode point of the amplifier, and consequently carries a voltage which is related to the common-mode signal at the two inputs of the differential amplifier. As the control signal taken from the output of the differential amplifier via the resistances $R_1$ and $R_2$ drives the differential amplifier in-phase, the base-emitter voltages of transistors $T_{13}$, $T_{14}$ and thus the collector-base voltages of transistors $T_1$, $T_2$ remain highly constant, so that the influence of the collector voltage on the base-emitter voltage is nil.

As the current in the two circuits of the current stabilizing arrangement according to the invention has a positive temperature coefficient and the base-emitter voltage of the transistor has a negative temperature coefficient, a suitable selection of the magnitude of the current will enable a temperature independent voltage $V_o$ to be taken from the common point of the resistances $R_1$ and $R_2$, which in the present embodiment is approximately $2E_{gap}$, $E_{gap}$ being the energy gap of the semiconductor material used.

Figure 5:
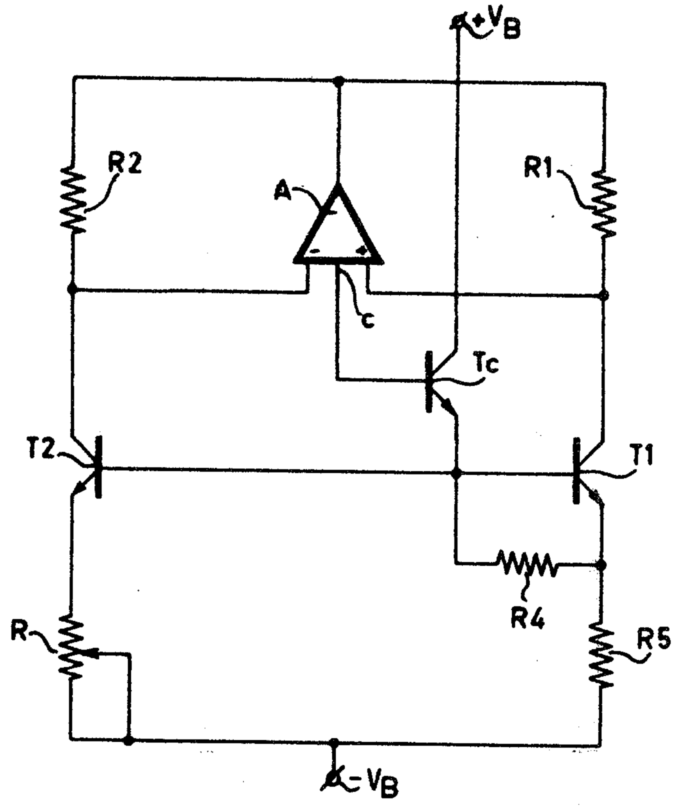

FIG. 5 shows a fourth embodiment in which steps have been taken which allow the temperature coefficient of the output current to be varied as desired. The differential amplifier A directly drives the first common terminal. A common-mode point c of the differential amplifier is connected via the emitter follower $T_c$ to the base electrodes of transistors $T_1$ and $T_2$. The collector of said transistor $T_c$ is connected to the positive terminal $+V_B$ of the supply source. In order to permit the temperature coefficient of the output current to be varied, two additional resistances have been included, a resistance $R_4$ in parallel with the base-emitter path of transistor $T_1$ and a resistance $R_5$ in the emitter circuit of said transistor. It appears that the temperature coefficient of the output current depends on the mutual ratio of the two resistances $R_4$ and $R_5$ and that by varying said ratio the output current can have either a positive or a negative temperature coefficient and, obviously, can also be temperature independent.

By only including a resistance $R_4$ between the base of transistor $T_1$ and the second common terminal $-V_B$, selection of the value of said resistances allows the temperature coefficient of the total current consumed by the current stabilising arrangement to be chosen at will so that said temperature coefficient may be positive, zero or negative.

Figure 6:
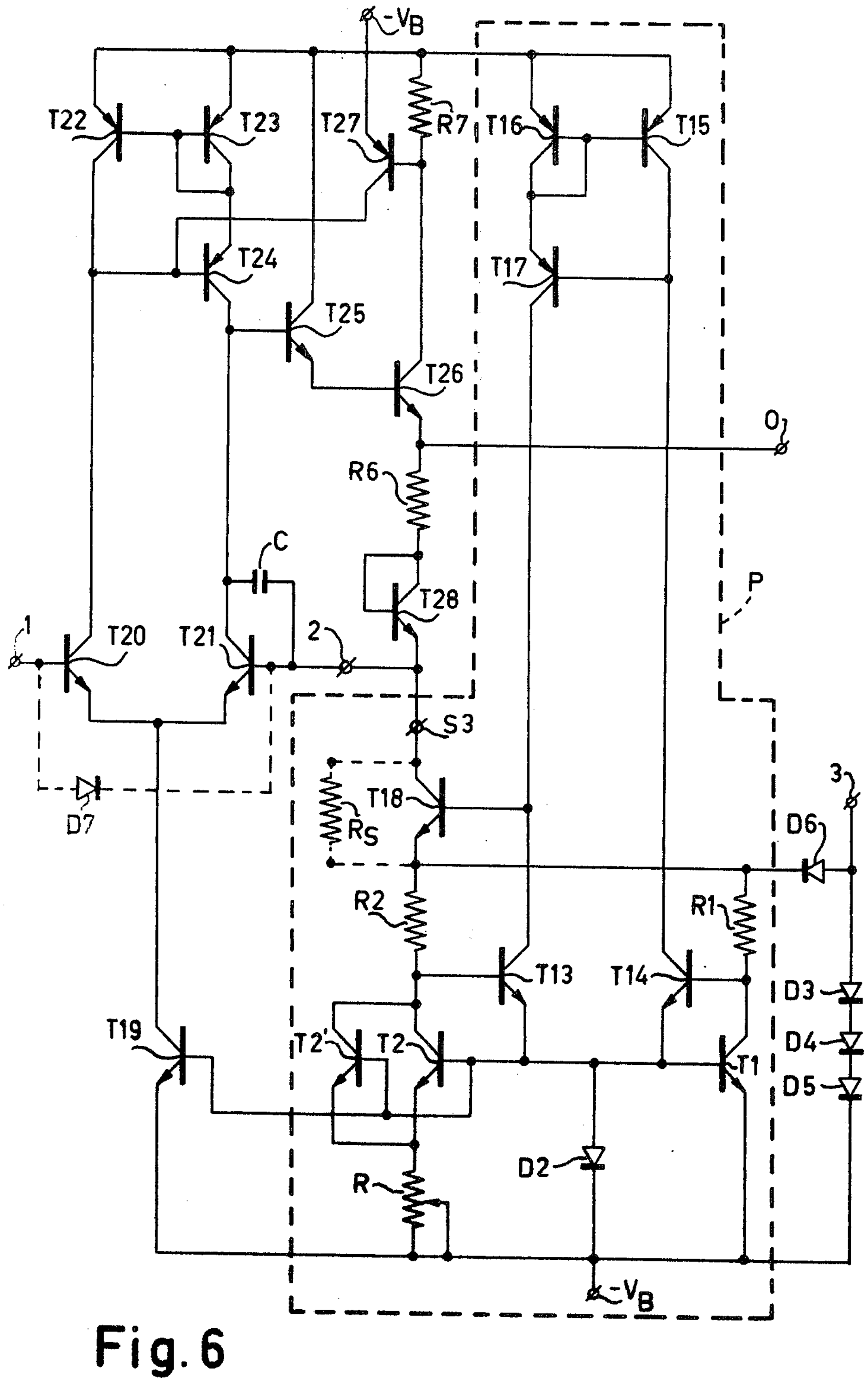
FIG. 6 shows the application of such a current stabilizing arrangement for obtaining a temperature independent reference voltage or current.

Finally, FIG. 6 shows an application of a current stabilizing arrangement according to the invention in which in a special manner use is made of the positive temperature coefficient of the output current of said current stabilising arrangement. The block P represents the current stabilizing arrangement, which is fully identical to the embodiment of FIG. 4. The current available at the output current terminal $S_3$ of said current stabilizing arrangement is fed to the series connection of a transistor $T_{28}$, which is connected as a diode, and a resistance $R_6$. Owing to the positive temperature coefficient of this current, a proper selection of the resistance $R_6$ will ensure that the voltage across the series connection of said resistance $R_6$ and the transistor $T_{28}$ is temperature independent. As is known, the resistance $R_6$ must then be selected so that the voltage across said series connection equals $E_{gap}$, which is the energy gap of the semiconductor material of transistor $T_{28}$.

The series connection of the resistance $R_6$ and the transistor $T_{28}$ is included between the output 0 and the inverting input 2 of the operational amplifier. Said operational amplifier may, for example, comprise a differential pair $T_{20}$ and $T_{21}$ whose emitters are connected to a current source $T_{19}$ and whose collectors are connected to the input and output of a triple current mirror consisting of transistors $T_{22}$, $T_{23}$ and $T_{24}$. By means of the said current mirror a single-ended push-pull stage is obtained and the unbalanced output signal is fed to the output terminal 0 via transistors $T_{25}$ and $T_{26}$ which are connected in emitter-follower arrangement.

At sufficient gain of the operational amplifier the voltage at the output terminal 0 will equal the voltage at the input terminal 1 plus $E_{gap}$, the voltage across the series connection of the resistance $R_6$ and transistor $T_{28}$. Thus, a temperature-independent voltage $E_{gap}$ relative to an arbitrary voltage, i.e. the voltage at the input terminal 1, is available at the output terminal 0. This is specifically useful for realizing a current source. If a resistance is included between the output terminal 0 and the input terminal 1, a current is obtained through this resistance which equals $E_{gap}$ divided by the value of said resistance, irrespective of the voltage at said input terminal 1. This is particularly useful in resistance measurements in which an accurately known current is sent through an impedance and in which the voltage across said impedance is measured.

Furthermore, FIG. 6 by way of example shows a starting circuit, which is required when putting the circuit arrangement into operation, to set the current stabilizing arrangement from the stable state with currents equal to zero to the desired stable state with currents not equal to zero. Said starting circuit consists of the series connection of three diodes $D_3$, $D_4$ and $D_5$ between a terminal 3 and the negative terminal $-V_B$ of the supply source. Said terminal 3 is further connected via a diode $D_6$ in the forward direction to the junction of resistances $R_1$ and $R_2$. If terminal 3 is connected to the positive voltage $+V_B$ via a resistance, a voltage is impressed on the junction of the resistances $R_1$ and $R_2$ which equals two diode voltages so that the current stabilizing arrangement is started. Once the circuit arrangement has assumed the desired stable state, diode $D_6$ is cut off and the starting circuit becomes insignificant.

Transistor $T_{27}$ in conjunction with the resistance $R_7$ constitutes a short circuit protection because at a specific high output current of the amplifier said transistor $T_{27}$ is turned on, so that the collector current of transistor $T_{20}$ is taken up and consequently the maximum drive current for transistors $T_{25}$ and $T_{26}$ is limited.

The capacitance C in parallel with the collector-base path of $T_{21}$ finally limits the frequency response of the amplifier so that a wider stability margin is obtained.

Instead of the starting circuit of FIG. 6 it is generally also possible to start the arrangement with the aid of a single resistance $R_s$, which is connected in parallel with the collector-emitter path of transistor $T_{18}$, as is denoted by dotted lines in FIG. 4. The terminal S3 must then be connected to a positive potential, generally the positive terminal $+V_B$ of the supply source. Said resistance $R_s$ = ensures that when the power supply is switched on a current is fed to the base of transistor $T_{13}$, so that the circuit arrangement is forced to start. In the desired stable state the transistor $T_{18}$ automatically regulates the total current for the resistances $R_1$ and $R_2$ to the correct value. The only requirement with which the resistance $R_s$ must comply is that its value must be such that the current through the resistance is smaller than the total current flowing through the resistances $R_1$ and $R_2$ in the stable state of the current stabilizing arrangement. The advantages of using said resistance $R_s$ compared with the known starting circuit with the diodes is that the total current taken up by the current stabilizing arrangement remains stabilized, this not being so in the case of the known starting circuit, as the diode circuit consumes a non-stabilized current.

If in the current stabilizing arrangement of FIG. 6 the same starting resistance $R_s$ is to be included in parallel with the collector-emitter path of transistor $T_{18}$, an additional provision must be made. As the differential stage $T_{20}$, $T_{21}$ does not become operative until the current stabilizing arrangement has started, the terminal $S_3$ before this instant has a potential which is close to the negative supply voltage, so that the current stabilizing arrangement cannot be started. This can be remedied by including an additional diode $D_7$ between the input terminal 1 and the terminal $S_3$, so that temporarily a potential is impressed on said terminal $S_3$ which is one diode voltage smaller than the potential at the input terminal, which is generally sufficient to allow the current stabilising arrangement to be started. Once the current stabilizing arrangement has started, the diode $D_7$ is cut off.

In the embodiment of the current stabilizing arrangement shown in FIG. 3 a starting resistance $R_s$ may be included in parallel with the collector-emitter path of transistor $T_{10}$, in which case the terminal $S_2$ is to be connected to the positive terminal $+V_B$ of the supply source via a load impedance.

What is claimed is:

1. A current stabilizing arrangement comprising first and second circuits connected in parallel between first and second common terminals, in which circuits two currents whose magnitudes have a mutually fixed ratio are sustained, the first circuit including the main current path of a first transistor of a first conductivity type, the second circuit including the main current path of a second transistor of said first conductivity type and a first impedance having one end connected to said second transistor and its other end connected to the second common terminal, means interconnecting the control electrodes of the first and second transistor, the first and second parallel circuits further including a second and a third impedance respectively, means connecting the first and second transistors via said scond and third impedances, respectively, to the first common terminal, a differential amplifier having a first and a second input, means connecting the first input of the differential amplifier to the end of the second impedance which is remote from the first common terminal and the second input to the end of the third impedance which is remote from the first common terminal, and means for applying to the control electrodes of the first and second transistors a control signal which is determined by the output signal of the differential amplifier.

2. A current stabilizing arrangement as claimed in claim 1, wherein the second and third impedances comprise the branches of a current amplifier which are connected between a first and a second terminal respectively and a sum terminal, the sum terminal being connected to the first common terminal thereby maintaining currents of a mutually fixed ratio in the two branches.

3. A current stabilizing arrangement as claimed in claim 1, wherein the second and third impedances comprise resistors.

4. A current stabilizing arrangement as claimed in claim 1 wherein the output signal of the differential amplifier is fed to the control electrodes of the first and second transistors.

5. A current stabilizing arrangement as claimed in claim 1 characterized in that the output signal of the differential amplifier is fed to the first common terminal and that the control electrodes of the first and the second transistor are connected to a terminal of the differential amplifier at which a voltage appears which is related to the common-mode signal at the two inputs of the differential amplifier.

6. A current stabilizing arrangement as claimed in claim 5, characterized in that the output of the differential amplifier is connected to the control electrode of a third transistor of the first conductivity type and having an emitter connected to the first common terminal.

7. A current stabilizing arrangement as claimed in claim 5 wherein the control electrodes of the first and the second transistor are connected to the common emitters of a transistor pair which constitutes a differential stage of the differential amplifier.

8. A current stabilizing arrangement as claimed in claim 7, wherein the control electrodes of the first and the second transistor are connected to the second common terminal via a diode connected in the forward direction.

9. A current stabilizing arrangement as claimed in claim 1 wherein the first circuit includes a first compensation resistance connected between the first transistor and the second common terminal and a second compensation resistance connected between the control electrode of said first transistor and the junction of said first transistor and the first compensation resistance.

10. A current stabilizing arrangement as claimed in claim 9, characterized in that the values of the first and second compensation resistances are chosen so that the current supplied by the current stabilizing arrangement is temperature independent.

11. A current stabilizing arrangement as claimed in claim 1 further comprising a compensation resistance connected between the control electrode of the first transistor and the second common terminal.

12. A current stabilizing arrangement as claimed in claim 11, wherein the compensation resistance has such a value that the current consumed by the complete arrangement is temperature-independent.

13. A current stabilizing arrangement as claimed in claim 1 wherein said control signal applying means comprises a transistor connected as an emitter follower and having a main current path bypassed by a resistor.

14. A current stabilizing arrangement as claimed in claim 6, characterized in that the main current path of the third transistor is bypassed by a resistance.

15. A current stabilizing circuit comprising, first and second common terminals, first and second circuits connected in parallel between said first and second terminals, said first circuit comprising a first impedance element and a first transistor connected in series between said first and second common terminals, said second circuit comprising a second impedance element, a second transistor and a third impedance element connected in series between said first and second common terminals, means directly connecting the control electrodes of said first and second transistors together, a differential amplifier having first and second input terminals and an output terminal, means connecting the first and second input terminals of said differential amplifier to said first and second impedance elements, respectively, and means coupled to the differential amplifier output terminal for coupling a control signal that is determined by the output signal of the differential amplifier to the control electrodes of said first and second transistors whereby the currents flowing in said first and second parallel circuits are maintained in a mutually fixed ratio determined by said first and second impedance elements.

16. A current stabilizing circuit as claimed in claim 15 wherein said differential amplifier comprises third and fourth transistors each having an output electrode, said stabilizing circuit further comprising a current amplifier having first and second terminals coupled to respective output electrodes of the third and fourth transistors and a third terminal coupled to one of said common terminals.

17. A current stabilizing circuit as claimed in claim 15 wherein said differential amplifier comprises third and fourth transistors each having an output electrode and a common mode terminal, said coupling means including means for supplying the differential amplifier output signal to one of said first and second common terminals and means coupling said common mode terminal to the control electrodes of said first and second transistors.

18. A current stabilizing circuit as claimed in claim 15 wherein said first and second impedance elements comprise equal resistors whereby equal currents are maintained in said first and second parallel circuits.

* * * * *

UNITED STATES PATENT AND TRADEMARK OFFICE

CERTIFICATE OF CORRECTION

PATENT NO. : 3,914,683

DATED : October 21, 1975

INVENTOR(S) : RUDY JOHAN VAN DE PLASSCHE

It is certified that error appears in the above-identified patent and that said Letters Patent are hereby corrected as shown below:

IN THE TITLE PAGE

"[30] Foreign Application Priority Data
Mar. 20, 1973 Netherlands..........7303851"

should read

--[30] Foreign Application Priority Data
Mar. 20, 1973 Netherlands..........7303851
Dec. 5, 1973 Netherlands..........7316639--

Signed and Sealed this

*Twenty-seventh* Day of *December 1977*

[SEAL]

*Attest:*

RUTH C. MASON
*Attesting Officer*

LUTRELLE F. PARKER
*Acting Commissioner of Patents and Trademarks*